(12) United States Patent
Kelsay et al.

(10) Patent No.: US 9,172,836 B2
(45) Date of Patent: Oct. 27, 2015

(54) OPTICAL SCANNER ILLUMINATION SYSTEM AND METHOD

(75) Inventors: C Greg Kelsay, Boise, ID (US); James E. Schaff, Meridian, ID (US); Jeffery Patrick, Eagle, ID (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 2555 days.

(21) Appl. No.: 11/895,893

(22) Filed: Aug. 28, 2007

(65) Prior Publication Data

US 2009/0059599 A1    Mar. 5, 2009

(51) Int. Cl.
  *H04N 1/46*      (2006.01)
  *H04N 1/028*     (2006.01)

(52) U.S. Cl.
  CPC ....... *H04N 1/02815* (2013.01); *H04N 1/02835* (2013.01); *H04N 2201/02493* (2013.01)

(58) Field of Classification Search
  CPC .......... H04N 1/02815; H04N 1/02835; H04N 2201/02493
  USPC ............ 362/300, 301, 302, 298, 297, 296.01, 362/257; 358/489, 473, 484, 474, 509
  See application file for complete search history.

(56) References Cited

U.S. PATENT DOCUMENTS

| | | |
|---|---|---|
| 5,412,205 A | 5/1995 | McVicar et al. |
| 5,550,650 A | 8/1996 | Pan |
| 5,663,782 A | 9/1997 | Saita et al. |
| 5,729,361 A | 3/1998 | Suggs et al. |
| 5,767,979 A | 6/1998 | Kim |
| 5,828,050 A | 10/1998 | Barkan |
| 5,930,433 A | 7/1999 | Williamson et al. |
| 5,969,372 A | 10/1999 | Stavely et al. |
| 5,986,774 A | 11/1999 | Han |
| 6,469,754 B1 | 10/2002 | Okumura |
| 6,565,248 B2 * | 5/2003 | Honguh et al. ............... 362/560 |
| 6,760,139 B2 | 7/2004 | Spears |
| 2002/0159099 A1 | 10/2002 | Huang et al. |
| 2003/0090749 A1 * | 5/2003 | Branson et al. ............... 358/509 |
| 2003/0128271 A1 | 7/2003 | Harrington |
| 2004/0004669 A1 * | 1/2004 | Fang ............................. 348/345 |
| 2004/0057228 A1 | 3/2004 | Huang et al. |
| 2004/0089718 A1 * | 5/2004 | Ando ............................. 235/454 |
| 2005/0157350 A1 | 7/2005 | Lee et al. |

FOREIGN PATENT DOCUMENTS

CN       1641399 A       7/2005

OTHER PUBLICATIONS

Office action issued in counterpart Chinese Patent Application No. 200880104901.8 (dated Mar. 24, 2011).

* cited by examiner

*Primary Examiner* — Martin Mushambo
(74) *Attorney, Agent, or Firm* — Law Office of Edouard Garcia

(57) ABSTRACT

An optical scanner having a scanner glass with a bottom surface includes an LED illumination source and a reflector, disposed below the glass. The illumination source has a target-oriented surface oriented to direct light toward the glass at a non-perpendicular angle. The reflector is oriented to direct light reflected off of the bottom surface toward the target-oriented surface.

22 Claims, 4 Drawing Sheets

OPTICAL SCANNER ILLUMINATION SYSTEM AND METHOD

BACKGROUND

The present disclosure relates to illumination systems for reduction-optics type scanners. Reduction-optics scanners typically use a cold cathode fluorescent (CCFL) bulb to provide the high illumination level required to generate an adequate signal when scanning an image. It is well known that CCFL bulbs typically require significant warm-up time (e.g. in the range of tens of seconds) and sometimes have problems with output stability. That is, the light output can vary with time and with position along the bulb.

One possible alternative to CCFL illumination systems for optical scanners is to use LED's for illumination. In recent years, high power bright white LED's have been developed. LED illumination offers the potential benefits of "instant on" functionality and consistent output levels, given proper thermal design. However, the use of LED's as an illumination source for a reduction optics type scanner can involve design compromises that cause some light not to reach the target area. One challenge to using bright white LED's in this sort of application is to achieve total light output that substantially matches a CCFL system, while also being cost effective.

BRIEF DESCRIPTION OF THE DRAWINGS

Various features and advantages of the invention will be apparent from the detailed description which follows, taken in conjunction with the accompanying drawings, which together illustrate, by way of example, features of the invention, and wherein.

DETAILED DESCRIPTION

Figure 1:
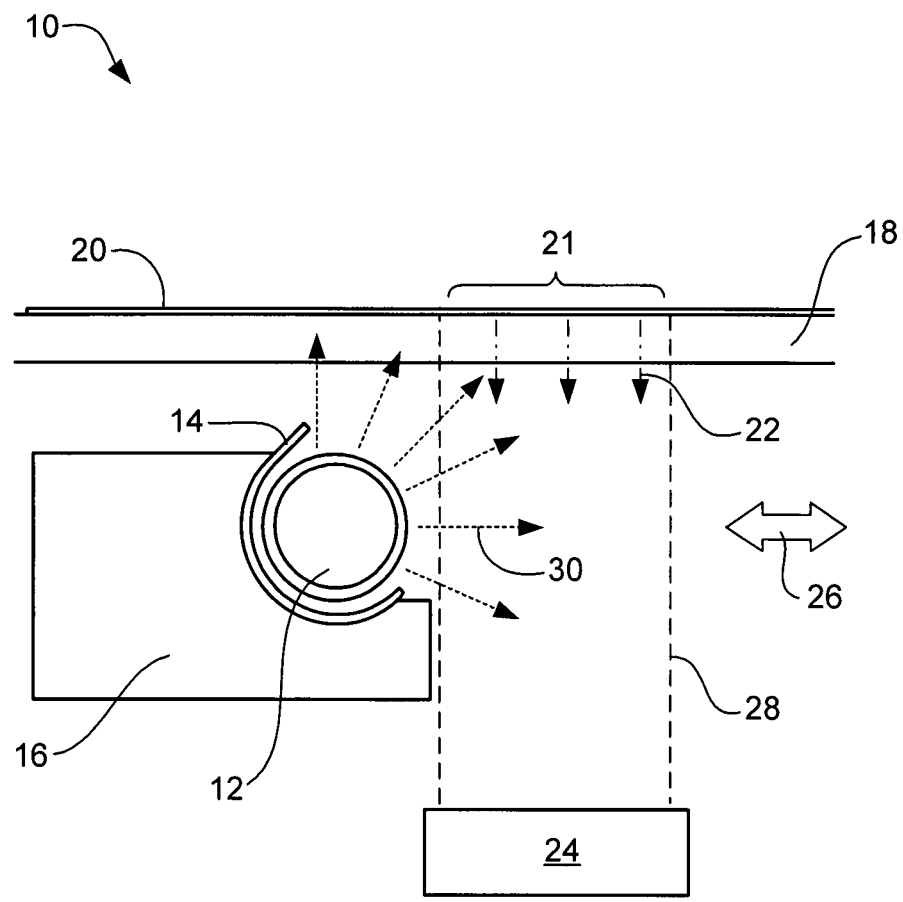
FIG. 1 is a cross-sectional view of a portion of an optical scanner having a CCFL illumination system.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

As noted above, reduction-optics type scanners typically include a cold cathode fluorescent (CCFL) bulb to provide the high illumination level required to generate an adequate signal for image scanning. One embodiment of an optical scanner system 10 having a CCFL illumination system is shown in FIG. 1. This system generally includes a CCFL bulb 12 with a reflector 14, both of which are attached to a moveable carriage 16 that is positioned below the scanner glass 18. Light from the CCFL bulb illuminates a portion of scanning media 20 (having an image thereupon) that is placed atop the scanner glass. Some of the light that strikes the scanning media within a target zone 21 is reflected (as indicated by arrows 22) downward toward a reduction optics and image sensor system 24. While the reduction optics and image sensor system is depicted as a simple box, it is to be understood that this box is intended to represent all lenses, mirrors, sensors, and other structure normally associated with a reduction optics sensor system. As the carriage 16 moves linearly below the scanner glass, in either or both of the directions indicated by arrow 26, light 22 that is reflected from the scanning media 20 and within a certain window or aperture, delineated by dashed lines 28, is sensed by the image sensor system and sequentially scanned to a sensing device (e.g. a CCD chip) to create a digital image of the image on the scanning media, in a manner well known in the art.

Unfortunately, CCFL scanning systems, such as that shown in FIG. 1, have certain characteristics that are not always desirable. First, CCFL bulbs tend to have slow warm up time and can have weaknesses in light output stability. Additionally, CCFL bulbs are round and emit light around their entire circumference, as illustrated in FIG. 1, where light from the CCFL bulb 12, represented by arrows 30, radiates out in all directions. This can produce a significant amount of wasted light. While the reflector 14 can capture some of the light and redirect it to the target zone 21, a certain amount of light is almost always wasted.

One possible alternative to CCFL illumination systems for optical scanners is to use light emitting diodes (LED's). High power LED's that generate illumination levels that are sufficient (when coupled with a well designed lightguide) for a reduction-optics scanning system have been developed and are now commercially available. LED illumination offers the potential of "instant on" functionality and consistent output levels. However, The use of LED's as an illumination source for a reduction optics type scanner can involve some design compromises that cause some light not to reach the target area.

Advantageously, the inventors have developed a high output reflector system that increases the light usage efficiency of an LED illumination system in a reduction optics type scanner. This reflector system captures light that is otherwise reflected or wasted, and redirects this light to the target zone for illumination of the scanner image, while minimizing the amount of image noise that can otherwise be created by image reflections. In one embodiment, the inventors have produced an LED illumination system with a reflector that provides scanning light output that exceeds that of a CCFL system. Given the development in high output LED's and the continuing improvements in light systems, of which this disclosure represents a part, it is believed that LED illumination systems will eventually be brighter than CCFL systems as current development patterns continue.

Figure 2:
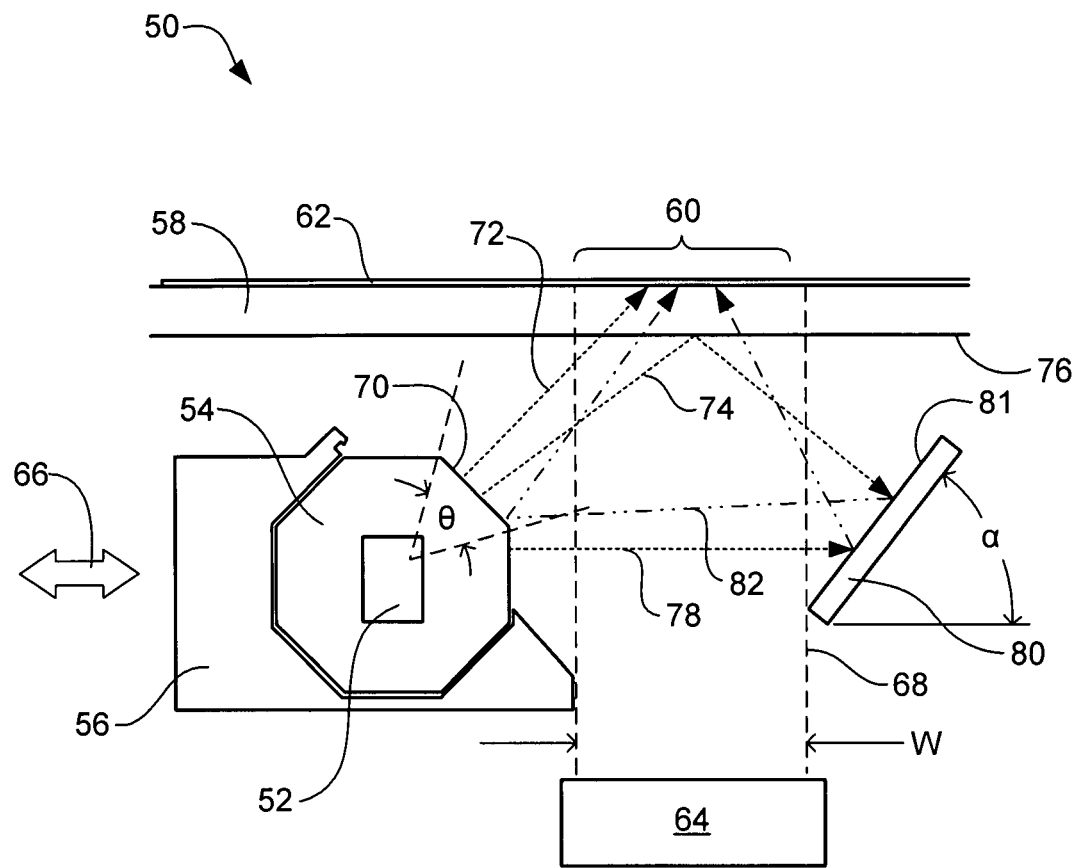
FIG. 2 is a cross-sectional view of a portion of an optical scanner incorporating one embodiment of an LED illumination system and reflector in accordance with the present disclosure.

One embodiment of an LED illumination and reflector system 50 configured in accordance with the present disclosure is shown in FIG. 2. This system generally includes an LED illumination source 52 (e.g. one or more high output LED's) and a lightguide 54, both of which are attached to a moveable carriage 56 that is positioned below the scanner glass 58. The lightguide is designed to distribute the light over the page width with relatively high uniformity and to randomize the output rays. Additionally, since LED's inherently produce relatively directional light, the lightguide coupled with the LED light source can produce a more focused illumination pattern than a CCFL bulb, which is round and emits light around it's entire circumference.

The lightguide 54 is configured to redirect the light from the LED 52 toward a target zone 60 of scanning media 62 (e.g. paper having an image thereupon) that is placed atop the scanner glass. As in the device shown in FIG. 1, light that strikes the scanning media within the target zone is reflected downward toward a reduction optics module 64. As with the embodiment of FIG. 1, the reduction optics module is intended to represent all of the lenses, mirrors, sensors (e.g. CCD sensors) and other elements normally associated with any type of reduction optics sensor device. As the carriage moves linearly below the scanner glass, in either or both of the directions indicated by arrow 66, light that is reflected from the scanning media and within a certain scanning window or aperture, delineated by dashed lines 68, is received by the reduction optics module and sequentially scanned to a sensing device (e.g. a CCD sensor, not shown) to create a digital image of the image on the scanning media, in a manner well known in the art. To give a sense of scale, the scanning window can have a width W of about 5 mm, for example.

One challenge for the lightguide system is to place as much of the LED's emission on the target scan line or target scan area as possible. With a well-designed lightguide 54, the emission pattern of the LED illumination system will be less than the full circumference of the lightguide. As shown in FIG. 2, for example, the illumination divergence angle θ for the majority of the light can be reduced to as little as 60-90 degrees. Additionally, because of geometric constraints, the lightguide itself is offset laterally from the targeted illumination area 60 due to the optics design of the reduction optics module 64. Because of these two design compromises—the illumination divergence angle and the lateral offset of the lightguide from the target area—a substantial amount of light does not reach the target area. In some cases, more than 50% of the light emitted from the light source 52 will not reach the target area. Much of this loss comes from the randomizing of light within the lightguide and its housing. This randomizing of light is desirable to create uniform illumination at the target area. While the lightguide can collimate the light to a small degree, a significant amount of collimation can reduce light uniformity, which can lead to streaks and other irregularities in a scanned image due to non-uniformity of the light.

In the image scanning system shown in FIG. 2, the lightguide 54 includes a target-oriented surface 70 through which a large portion of the light emanates. This surface is oriented at an angle that is non-perpendicular to the scanner glass 58, and in the embodiment of FIG. 2 is oriented at about 45 degrees relative to the scanner glass. In this configuration, a large portion of the light from the LED light source 52 (which exits the target-oriented surface generally perpendicularly thereto) is directed toward the target zone 60 in a primary light direction, represented by arrow 72. This primary light direction is selected to direct the light toward the target zone with minimal reflections. While the lightguide is shown as being octagonal in cross section in FIG. 2, other shapes can be used, such as circular, etc. The primary function of the lightguide is to distribute light from the LED along the length of the lightguide, and to randomize the output rays. The lightguide can be of a wide variety of transmissive materials. For example, a wide variety of optically clear resin materials, such as acrylic or polycarbonate can be used.

While much of the light emanating from the target-oriented surface 70 is directed in the primary light direction 72, some light does not exit in the primary light direction. For example, some light, represented by arrow 74, exits the lightguide at a shallower angle, and is reflected off of the lower surface 76 of the scanner glass. This light is referred to herein as "bottom-reflected light." Additionally, while the primary light divergence angle can be reduced to as low as 60-90 degrees, as noted above, a large fraction of the total light that is emitted by the LED light source 52 does not reach the target zone 60, but radiates in other directions, partly because of the randomizing effect of the lightguide 54. In some cases more than 50% of the light emitted from the light source does not reach the target zone. Light that does not reach the target zone, but is emitted from the lightguide in various directions, such as in a lateral direction, as represented by arrow 78, is referred to herein as "misdirected light." Ordinarily, both the bottom-reflected and misdirected light would be wasted.

Advantageously, the inventors have developed a high output reflector that can recapture at least some portion of bottom-reflected light and misdirected light, and reflect these back to the target area 60. As shown in FIG. 2, the reflector 80 can be positioned on an opposite side of the scanning window or aperture 68 from the LED illumination source (the LED source 52 and lightguide 54). In the embodiment of FIG. 2, the reflector has a flat reflector surface 81. Though not shown, the reflector is connected to the carriage 56, so that the relative locations of the lightguide and reflector are substantially fixed as the carriage moves (in the direction of arrow 66) during scanning. The reflector is oriented at an angle α with respect to the horizontal, this angle being chosen to increase reflection of light back to the target zone without reflecting "recycled" light from the target area itself. Considerations related to the angle α and the prevention of reflecting recycled light are discussed in more detail below.

Because of its position and orientation, the reflector 80 intercepts some portion of bottom-reflected light. This light is indicated by arrow 74 in FIG. 2. The reflector reflects the bottom-reflected light back toward the target-oriented surface 70, as indicated by arrow 82. Consequently the reflected light indicated by arrow 82 strikes the angled target-oriented surface 70 and is reflected up to the target zone 60. In this way, at least some portion of the bottom-reflected light 74 is reflected back into the target zone, without being wasted.

Additionally, at least some portion of the misdirected light, represented by arrow 78, is also intercepted by the reflector 80, and this light is reflected up into the target zone 60. Thus, the reflector intercepts and redirects two types of otherwise wasted light into the target zone, to be used for scanning illumination.

One issue addressed by this reflector system is to recapture light that has not yet reached the target area, without recapturing reflected light that has already reached the target area. Reflected light that has reached the target area may have been affected by the original document image, and its reflection back into the target zone (and thence to the reduction optics module) could taint the quality of the scanned image if recycled. It is desirable to place the reflector in relation to the lightguide and the target illumination area in order to create illumination at the target area that is not "recycled" from the target area itself. Placement variables include the position (including angle) of the reflector and geometry of the reflector surface (i.e. flat or curved). To accomplish this, the inventors first analyze the geometry of the reflecting surfaces using Snell's Law. Snell's law (also known as Descartes' Law or the law of refraction) is a well-known formula that describes the relationship between the angles of incidence and refraction of light or other waves passing through a boundary between two different isotropic media, such as air and glass. Using this law, the inventors analyze the complex ray patterns that are expected from the lightguide and produce a first order estimate, then perform testing of the resulting geometry to confirm that reflected images are not recycled into the system. By preventing reflected image light from being redirected to the target zone, this system reduces noise in the resulting image.

The reflector can be any material that is sufficiently durable for scanner use and has sufficient reflectance in the visible spectrum. Reflector material can also be selected to achieve efficiency and uniformity of reflectance. Those skilled in the art will recognize that there are many reflective materials that provide 90% or greater reflectivity in the visible spectrum. The reflector can be a mirror (glass or otherwise) or a reflective metal surface. On the other hand, non-metal reflective materials can also be used. For example, a white opaque sheet (polycarbonate or equivalent) has been used for this reflector surface. Another material that has been used is Lumirror 20®, which is a commercially available polyester reflective tape.

Figure 3:
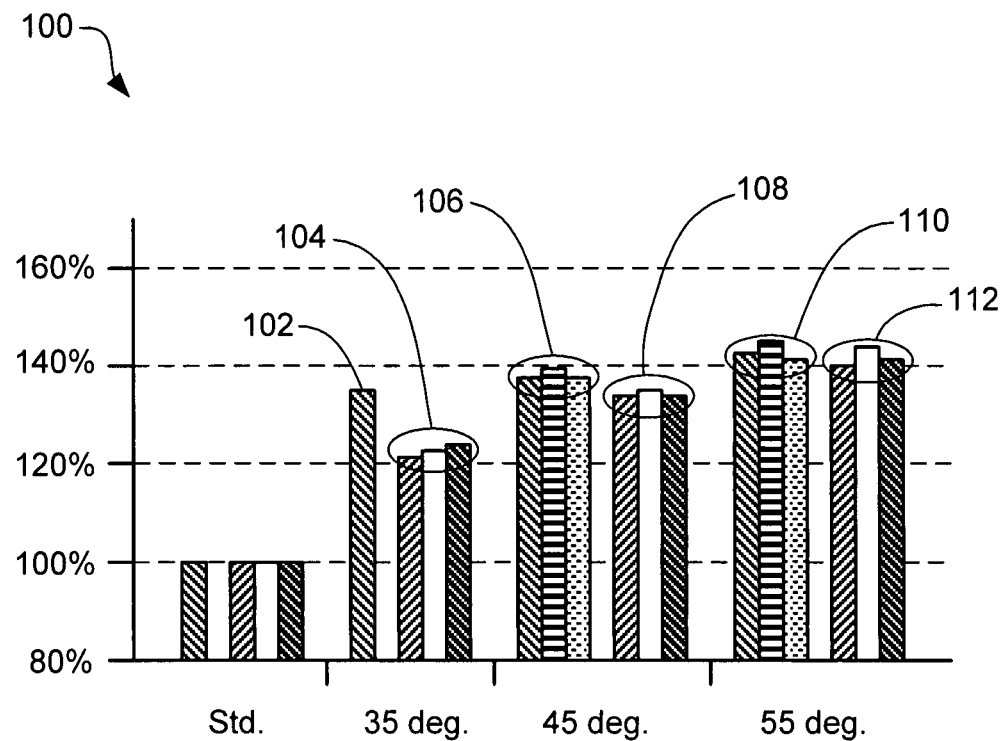
FIG. 3 is a chart of relative light output versus reflector rotation angle for three different embodiments of an LED illumination system and reflector in accordance with the present disclosure.

The inventors have considered and tested the effects of variation in the reflector angle $\alpha$. In general, it has been found that a steeper reflector angle provides greater light recycling while also minimizing shadows, reflections and other noise in the image from recycled image light. Angles in the range of from about 35 degrees to about 70 degrees are believed to be suitable. Shown in FIG. 3 is a chart 100 of relative light output versus reflector rotation angle $\alpha$ for three different embodiments or configurations of a white LED illumination system and reflector in accordance with the present disclosure. As indicated by the graph legend, these tests were conducted in scanner systems configured for both 300 dpi and 600 dpi resolution. The 100% values shown on the left represent the base light output for a system like that in FIG. 2 without a reflector 80. When the reflector was positioned with an angle $\alpha$ of 35 degrees, a system scanning at 300 dpi had more than 30% increase in scanner light output as measured by a CCD sensor through a red band pass filter, as indicated at 102. In a 600 dpi system, the output measured through red green and blue filters increased more than 20% each, as indicated at 104.

When the reflector angle was increased to 45 degrees, both the 300 dpi and 600 dpi systems had an increase of more than 30% for all colors, and nearly 40% in the case of the 300 dpi system, as indicated at 106 and 108. Finally, when the reflector angle was increased to 55 degrees, both systems experienced light increases of more than 40%, and nearly 50%, as indicated at 110 and 112.

Figure 4:
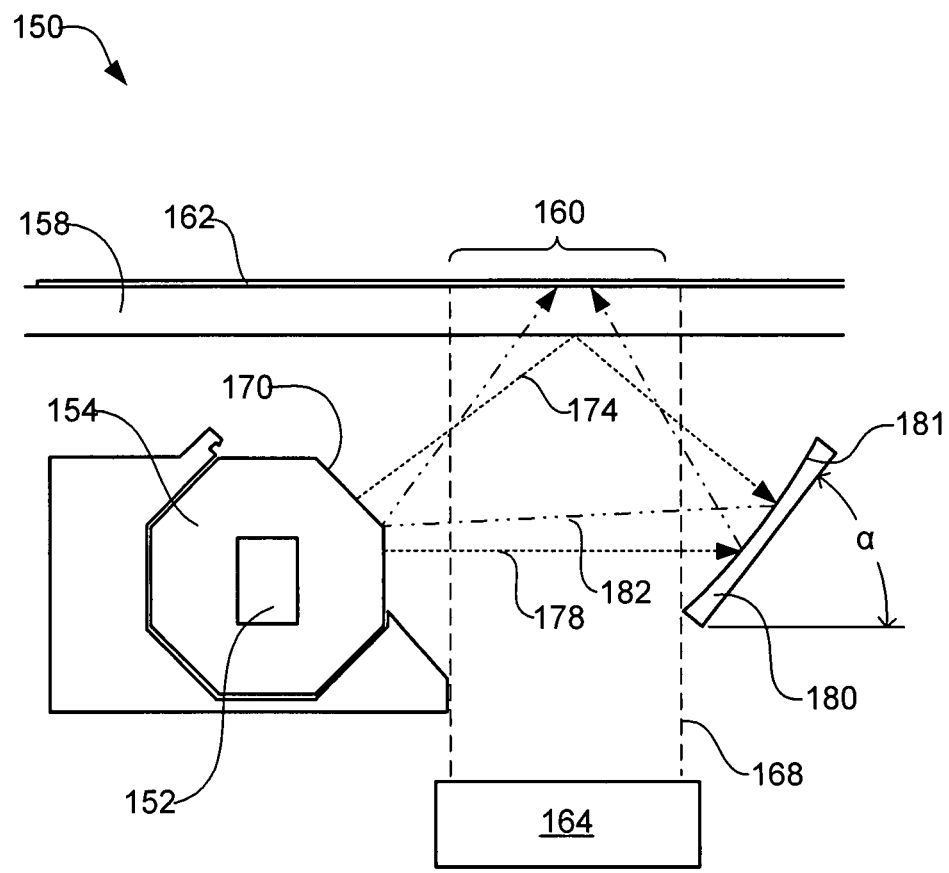
FIG. 4 is a cross-sectional view of a portion of an optical scanner incorporating another embodiment of an LED illumination system with a reflector having a curved reflector surface, in accordance with the present disclosure.

Another embodiment of an LED illumination and reflector system 150 configured in accordance with the present disclosure is shown in FIG. 4. Like the system illustrated in FIG. 2 and described above, this system generally includes an LED illumination source 152 and a lightguide 154, positioned below the scanner glass 158, as described above. The lightguide redirects light from the lightguide toward a target zone 160 of the scanner glass. Light that strikes the scanning media 162 within the target zone is reflected downward within a scanning aperture 168 toward a reduction optics module 164 to create a digital image.

As with the embodiment of FIG. 2, the lightguide 154 includes a target-oriented surface 170 through which a large portion of the light emanates, though light emitted from the lightguide in the primary light direction is not shown in this view. In order to redirect bottom-reflected light (represented by rays 174) and misdirected light (represented by rays 178) back to the target zone 160, this embodiment includes a reflector 180 with a curved reflecting surface 181. The reflector shown in FIG. 4 has a concave reflective surface of relatively constant radius. However, it is to be appreciated that other curved surfaces can also be used. For example, convex surfaces, irregularly curved surfaces, freeform surfaces, etc. can also be used, depending upon particular conditions and the specific geometry of the scanner illumination system. The reflector is oriented at an angle $\alpha$ with respect to the horizontal, the angle being chosen to increase reflection of light back to the target zone without reflecting "recycled" light from the target area itself, as discussed above.

Because of its position and orientation, the reflector 180 intercepts some portion of bottom-reflected light 174 and reflects this light back toward the target-oriented surface 170, as indicated by arrow 182, where it is reflected up to the target zone 160. Likewise, at least some portion of the misdirected light 178 is also intercepted by the reflector, and this light is reflected up into the target zone. Thus, the reflector intercepts and redirects two types of otherwise wasted light into the target zone, to be used for scanning illumination. It is believed that a curved reflector can be optimized to recapture a larger portion of bottom-reflected and misdirected light that would otherwise be wasted.

This illumination system thus provides an optical scanner having an LED light source and a reflector positioned to redirect reflected light and misdirected light back to the target area, without recycling reflected light that has already reached the target area. This system allows the use of bright white LED's in a reduction-optics type scanner to achieve total light output that substantially matches the output of a CCFL system in a cost effective illumination system.

The reflector system recaptures otherwise lost output from the lightguide and channels this light back into the imaging window. Unlike prior CCFL systems, which emit light 360 degrees around the circumference of the light bulb, the LED/lightguide combination is a designed optic that is intended to emit a specific illumination pattern in both circumference and along the length. The reflector positioned in relation to the emission pattern of the lightguide is a beneficial aspect of this system. Because of the more directed optical output provided by the lightguide, the gains from the use of the reflector are greater in this system than are the gains from a reflector in a CCFL system. More efficient capture of the LED output equates to higher illumination levels for the LED solution and lower cost (i.e. allows lower power consumption or a smaller LED), which in turn allows adequate illumination in an LED illuminated scanner system. Without this reflector system, it might be necessary to either settle for lower image quality or wait for the development of brighter LED's.

This system allows both high depth of focus (enabled by the reduction optics scanner) and instant-on scanning. By combining an optically optimized reflector system and super bright white (or other color) LED's in an optical reduction type scanner, the legacy CCFL illumination system can be replaced. A selected combination of reflector position and tuned lightguide with reflective surfaces can provide an output gain of up to 50%, and it is believed that greater improvements are also possible. It is also believed that this type of LED illumination system could also be used in other applications that currently use CCFL bulbs for backlighting or illumination.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:
1. An optical scanner having a scanner glass with a bottom surface, comprising:
 an LED illumination source, disposed below the glass, having a target-oriented surface oriented to direct light toward the glass at a non-perpendicular angle; and a reflector, disposed below the glass, oriented to direct light reflected off of the bottom surface toward the target-oriented surface.

2. An optical scanner in accordance with claim 1, further comprising a scanning aperture, the LED illumination source being disposed on a first side of the scanning aperture, and the reflector being positioned on a second side of the scanning aperture.

3. An optical scanner in accordance with claim 1, wherein the lightguide is oriented to direct at least some light produced by the LED illumination source toward the glass at an angle of about 45 degrees.

4. An optical scanner in accordance with claim 1, wherein the reflector is oriented to direct misdirected light from the LED illumination source toward a target area of the scanner glass.

5. An optical scanner in accordance with claim 1, wherein the reflector is oriented at an angle of from about 35 degrees to about 70 degrees relative to the horizontal.

6. An optical scanner in accordance with claim 5, wherein the reflector is oriented at an angle of about 55 degrees relative to the horizontal.

7. An optical scanner in accordance with claim 1, wherein the reflector is non-metal.

8. An optical scanner in accordance with claim 7, wherein the reflector comprises reflective tape disposed upon a substrate.

9. An optical scanner in accordance with claim 1, wherein the reflector comprises a mirror.

10. An optical scanner in accordance with claim 1, wherein the reflector has a curved reflector surface.

11. An optical scanner in accordance with claim 1, wherein:
the target-oriented surface oriented to direct light from the LED illumination source toward the glass at a non-perpendicular angle; and
the reflector is oriented to direct light directed by the target-oriented surface and reflected off of the bottom surface toward the target-oriented surface.

12. An optical scanner in accordance with claim 1, wherein:
the target-oriented surface is a planar surface that is perpendicular to a primary light direction along which light from the LED illumination source primarily is toward the glass; and
the reflector and the target-oriented surface are arranged such that the reflected light directed by the reflector is reflected by the target-oriented surface toward the glass.

13. An LED illumination system for an optical scanner having a scanner glass with a bottom surface, comprising:
an LED illumination source, disposed below the scanner glass;
a lightguide, coupled to the illumination source, having a target-oriented surface oriented to direct light from the illumination source toward a target zone of the glass at a non-perpendicular angle; and
a reflector, disposed below the glass, oriented to direct light reflected off of the bottom surface toward the target-oriented surface.

14. An optical scanner in accordance with claim 13, wherein the reflector is oriented to direct lateral light leakage from the LED illumination source toward a target area of the scanner glass.

15. An optical scanner in accordance with claim 13, wherein the reflector is oriented at an angle of from about 35 degrees to about 70 degrees relative to the horizontal.

16. An optical scanner in accordance with claim 13, wherein the reflector has a curved reflector surface.

17. An optical scanner in accordance with claim 13, wherein the reflector is of a material selected to reflect at least about 90% of incident visible light.

18. An optical scanner in accordance with claim 13, wherein the reflector is of a material selected from the group consisting of metals, non-metals, a glass mirror, polycarbonate, and reflective tape disposed upon a substrate.

19. A method for recovering illumination light in an optical scanner having an LED illumination device with a reflective surface, a scanner glass, and a target illumination zone, comprising the steps of:
intercepting bottom-reflected illumination light that reflects off of a bottom surface of the scanner glass; and
reflecting the bottom-reflected light toward the reflective surface of the LED illumination device, and thence toward the target illumination zone.

20. A method in accordance with claim 19, further comprising the step of intercepting lateral light leakage from the LED illumination device, and reflecting the light leakage toward the target illumination zone.

21. A method in accordance with claim 20, wherein the steps of intercepting bottom-reflected illumination light and lateral light leakage further comprise positioning a reflector adjacent to the LED illumination device in a position selected to intercept and reflect the bottom-reflected light and the lateral light leakage.

22. A method in accordance with claim 21, wherein the step of positioning the reflector further comprises positioning a reflector having a curved reflector surface.

* * * * *